United States Patent [19]

Ishikawa

[11] 4,199,048
[45] Apr. 22, 1980

[54] CLUTCH CONTROL SYSTEM WITH THERMOSTATIC REGULATOR VALVE

[75] Inventor: Kazuo Ishikawa, Hoi, Japan

[73] Assignee: Aisin Seiki Kabushiki Kaisha, Aichi, Japan

[21] Appl. No.: 845,458

[22] Filed: Oct. 25, 1977

[30] Foreign Application Priority Data

Oct. 26, 1976 [JP] Japan ................................ 51-129172

[51] Int. Cl.² ........................ B60K 41/02; B60K 41/22

[52] U.S. Cl. ................................ 192/0.052; 192/3.57; 192/82 T; 192/0.075

[58] Field of Search ................... 192/0.052, 3.54, 3.55, 192/3.57, 3.63, 82 T; 236/93 R, 101 E; 137/468

[56] References Cited

U.S. PATENT DOCUMENTS

| | | | |
|---|---|---|---|
| 2,189,681 | 2/1940 | Sanford et al. | 192/3.57 |
| 2,283,903 | 5/1942 | Ashcraft | 236/75 |
| 2,341,631 | 2/1944 | Leukhardt | 192/0.052 |
| 2,844,768 | 7/1958 | Hilgert | 236/75 |
| 3,177,993 | 4/1965 | Riehl | 192/82 T |
| 3,332,436 | 7/1967 | Welty | 137/468 |
| 4,037,697 | 7/1977 | Prenzel | 192/82 T |

*Primary Examiner*—C. J. Husar
*Assistant Examiner*—David C. Reichard
*Attorney, Agent, or Firm*—Oblon, Fisher, Spivak, McClelland & Maier

[57] ABSTRACT

A clutch control system for a manual transmission comprises a servo cylinder for selectively engaging a clutch engagement mechanism, and a shift valve for connecting a source of oil pressure to the servo cylinder upon shifting of the transmission to operate the servo cylinder and for connecting the servo cylinder to an oil reservoir after shifting of the transmission to release the operation of the servo cylinder. The control system further comprises a thermostatically operated valve associated with the shift valve for controlling the flow of oil discharged from the servo cylinder to the oil reservoir in accordance with changes of the oil temperature.

5 Claims, 3 Drawing Figures

CLUTCH CONTROL SYSTEM WITH THERMOSTATIC REGULATOR VALVE

BACKGROUND OF THE INVENTION

1. Field of the Invention

The present invention relates to a clutch control system, and more particularly to a control system of a clutch engagement mechanism for a manual transmission which comprises a servo cylinder to engage and disengage the clutch engagement mechanism, and a shift valve to connect a source of oil pressure to the servo cylinder upon shifting of the transmission to operate the servo cylinder and to connect the servo cylinder to an oil reservoir after shifting of the transmission to release the operation of the servo cylinder.

2. Description of the Prior Art

In conventional clutch control systems of this kind, it is observed that if the oil temperature changes, smooth engagement of the clutch engagement mechanism cannot be obtained due to changes of the viscosity of working oil supplied into the servo cylinder. It is, therefore, very important that the flow of working oil in the system is controlled in accordance with changes of the oil viscosity to ensure smooth engagement of the clutch engagement mechanism.

SUMMARY OF THE INVENTION

The primary object of the present invention is to provide a clutch control system wherein the flow of working oil discharged from the servo cylinder is controlled in accordance with changes of the oil temperature to ensure smooth engagement of the clutch engagement mechanism.

According to the present invention, there is provided a control system of a clutch engagement mechanism drivingly connected to an output shaft of an engine and an input shaft of a transmission shifted by a manual lever. The system comprises servo means operatively connected to the clutch engagment mechanism for engaging and disengaging the clutch engagement mechanism, shift valve means for connecting a source of oil pressure to the servo means upon shifting of the manual lever to operate the servo means and for connecting the servo means to an oil reservoir after shifting of the manual lever to release the operation of the servo means, and thermostatically operated valve means associated with the shift valve means for controlling the flow of oil discharged from the servo means to the oil reservoir in accordance with changes of the oil temperature.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 illustrates another modification of the thermostatic regulator valve.

DESCRIPTION OF THE PREFERRED EMBODIMENTS

Figure 1:
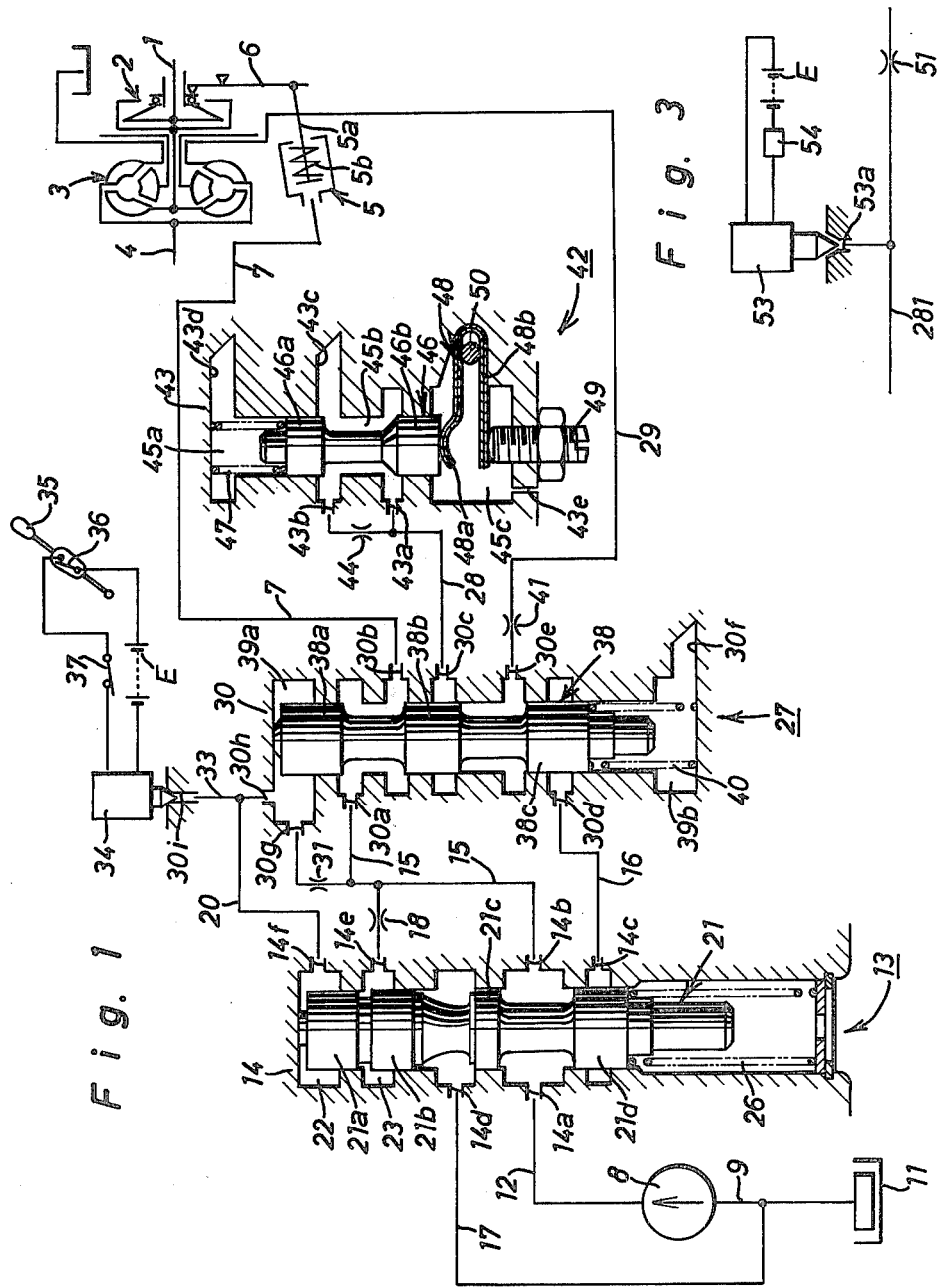
FIG. 1 illustrates a clutch control system in accordance with the present invention.

Referring now to the accompanying drawings, in FIG. 1, there is illustrated a hydraulic control system of a clutch engagement mechanism 2 for a manual transmission. The clutch engagement mechanism 2 is drivingly connected at one hand thereof with an output shaft 4 of a prime engine by way of a torque converter 3 and connected at the other hand thereof with an input shaft 1 of the manual transmission. A hydraulic servo cylinder 5 is operatively connected to the clutch engagement mechanism 2 by way of a piston rod $5a$ and a release fork lever 6. In this assembly, engagement of the clutch engagement mechanism 2 is maintained due to retraction of the piston rod $5a$ under biasing force of a compression spring $5b$ in the cylinder 5 and is released by operation of the servo cylinder 5. The operation of the servo cylinder 5 is conducted by hydraulic pressure applied through a fluid circuit 7 under control of line pressure from an oil pump 8. The oil pump 8 is connected to an oil reservoir 11 through a fluid circuit 9 and is driven by the prime engine to generate the line pressure in a fluid circuit 12.

A regulator valve 13 is provided to control the line pressure supplied from the oil pump 8 in response to open and close of a solenoid valve 34, as described hereinafter in detail. The regulator valve 13 comprises a spool 21 reciprocable within a housing 14 and a compression spring 26 biasing the spool 21 upward with a predetermined load. The housing 14 is provided thereon with six ports $14a$ to $14f$, inclusive. The first port $14a$ is connected to the oil pump 8 through the fluid circuit 12, and the fourth port $14d$ is connected to the reservoir 11 through a fluid circuit 17. The second and third ports $14b$ and $14c$ are respectively connected to fluid circuits 15 and 16. The fifth port $14e$ is connected to the fluid circuit 15 through an orifice 18 and the sixth port $14f$ is connected to a fluid circuit 20. The spool 21 is provided thereon with four lands $21a$ to $21d$, the diameter of the land $21a$ being smaller than those of the remained lands $21b$ to $21d$. Within the housing 14, a first pressure chamber 22 is formed by the land $21a$ and a second pressure chamber 23 is formed between the lands $21a$ and $21b$.

A shift valve 27 is provided to selectively connect the fluid circuit 7 to the fluid circuit 15 and a fluid circuit 28 and simultaneously connect the fluid circuit 16 to a fluid circuit 29. The shift valve 27 comprises a spool 38 reciprocable within a housing 30 and a compression spring 40 biasing the spool 38 upward with a predetermined load. The housing 30 is provided thereon with eight ports $30a$ to $30h$, inclusive. The first and fourth ports $30a$ and $30d$ are respectively connected to the fluid circuits 15 and 16, and the seventh port $30g$ is connected to the fluid circuit 15 through an orifice 31. The eighth port $30h$ is connected to the fluid circuit 20 and also connected through a fluid circuit 33 to a drain port $30i$ provided on the housing 30. The drain port $30i$ is selectively connected to the reservoir 11 in response to opening and closing of the solenoid valve 34. The second port $30b$ is connected to the fluid circuit 7, and the third port $30c$ is connected to a thermostatic regulator valve 42 through the fluid circuit 28. The fifth port $30e$ is connected to the torque converter 3 through the fluid circuit 29 with an orifice 41, and the sixth port $30f$ is connected to the reservoir 11. The spool 38 has a land $38a$ forming an upper chamber $39a$ in communication with the first chamber 22 of the regulator valve 13 and a land 38c forming a lower chamber 39b in communication with the reservoir 11. The spool 38 is further provided thereon with a land 38b to selectively open and close the port 30c. In the shift valve 27, when the spool 38 is moved downward against the spring 40, as described hereinafter, the second port 30b is connected to the third port 30c and the fourth port 30d is connected to the fifth port 30e, while the first port 30a is blocked by the land 38a of the spool 38.

The solenoid valve 34 is connected at its one end to a minus terminal of a vehicle battery E and at its other end to a plus terminal of the battery E through a normally closed switch 37 and a normally open switch 36. The normally open switch 36 is mounted on a portion of a manual shift lever 35 of the transmission to be closed upon shifting of the lever 35. The normally closed switch 37 is arranged to be opened by depression of an accelerator pedal of the prime engine. Therefore, when the shift lever 35 is in a shifted position or the accelerator pedal is depressed, the solenoid valve 34 is deenergized to close the drain port 30i of the shift valve 27. When the shift lever 35 is shifted to changeover the transmission under release of the accelerator pedal, the solenoid valve 34 is energized by closing of the switch 36 to open the drain port 30i of the valve 27.

The thermostatic regulator valve 42 is provided to control the degree of opening of the fluid circuit 28 connected to the reservoir 11 in accordance with changes of viscosity of the discharged oil from the servo cylinder 5. The thermostatic regulator valve 42 comprises a spool 46 reciprocable within a housing 43, a compression spring 47 biasing downward the spool 46 with a predetermined load, and a bimetallic element 48 receiving the spool 46 thereon. The housing 43 is provided thereon with five ports 43a to 43e, inclusive. The first port 43a is connected to the fluid circuit 28 and the second port 43b is also connected to the fluid circuit 28 through an orifice 44. The remained ports 43c to 43e are connected to the reservoir 11. Within the housing 43, upper and lower chambers 45a and 45c are respectively formed by lands 46a and 46b of the spool 46, and an annular drain chamber 45b is formed between the lands 46a and 46b. The bimetallic element 48 is supported to a portion of the housing 43 by a screw 50 and has an actuating arm 48a receiving the spool 46 thereon and a supporting arm 48b engaged with an adjusting screw 49.

The arms 48a and 48b of the bimetallic element 48 are exposed to working oil stored within the lower chamber 45c so that the actuating arm 48a flexes upwardly against biasing force of the spring 47 in accordance with rise of the oil temperature and flexes downwardly by biasing force of the spring 47 in accordance with fall of the oil temperature. With this regulator valve 42, when the temperature of working oil in the chamber 45c becomes high, the spool 46 is moved up against the spring 47 by upward flexure of the actuating arm 48a of the bimetallic element 48 to decrease the open degree of the fluid circuit 28. When the oil temperature becomes low, the spool 46 is moved down by biasing force of the spring 47 to increase the open degree of the fluid circuit 28.

OPERATION

When the manual shift lever 35 is in the neutral position during inoperative condition of the oil pump 8, the solenoid valve 34 is deenergized due to opening of the switch 36 to close the drain port 30i of the shift valve 27. In this instance, the spools 21 and 38 of the regulator and shift valves 13 and 27 are respectively in their upward stroke ends due to biasing forces of the springs 26 and 40, and the piston rod 5a of the servo cylinder 5 is retracted by the spring 5b to engage the clutch engagement mechanism 2. Upon starting the engine, the oil pump 8 is driven to generate line pressure in the fluid circuits 12 and 15. The line pressure is applied to the pressure chamber 23 of the valve 13 through the orifice 18 and further applied to the pressure chamber 22 of the valve 13 through the orifice 31, the upper chamber 39a of the valve 27 and the fluid circuit 20. Then, the spool 21 of the valve 13 is moved downward by the pressures developed in the pressure chambers 22 and 23 against biasing force of the spring 26 to connect the circuit 12 to the circuit 16 and, at the same time, the spool 38 of the valve 27 is moved downward by the pressure in the upper chamber 39a against the spring 40 to connect the circuit 16 to the circuit 29 and to connect the circuit 7 to the circuit 28. Thus, the line pressure is controlled in a first predetermined low value in accordance with the downward movement of the spool 21 and, in turn, the controlled line pressure is applied to the torque converter 3 through the circuits 16 and 29. In this instance, the servo cylinder 5 is in the inoperative condition to maintain the engagement of the clutch engagement mechanism 2.

When the manual shift lever 35 is shifted toward the first forward position under release of the accelerator pedal, the switch 36 is closed under closure of the switch 37 to supply the solenoid valve 34 with electric energy of the battery E. Then, the solenoid valve 34 is energized to open the drain port 30i of the valve 27. This connects the circuit 33 to the reservoir 11 so as to release the respective pressures in the chambers 22 and 39a of the valves 13 and 27. Thus, the pressure in the second pressure chamber 23 of the valve 13 is balanced with biasing force of the spring 26 so that the line pressure is controlled in a second predetermined high value. At the same time, the spool 38 of the valve 27 is moved upward by biasing force of the spring 40 to connect the circuit 7 with the circuit 15. Then, the servo cylinder 5 is operated by the controlled line pressure supplied from the regulator valve 13 through the circuits 15 and 7 and, in turn, the clutch engagement mechanism 2 is disengaged by operation of the cylinder 5. In this instance, the supply of working oil to the converter 3 is temporarily interrupted by the valve 27.

Immediately after shifting operation of the manual shift lever 35, the switch 36 is opened to deenergize the solenoid valve 34 so as to close the drain port 30i of the valve 27. Then, the controlled line pressure is applied to the pressure chamber 22 of the valve 13 from the circuit 15 through the orifice 31 and the upper chamber 39a of the valve 27 so that the pressures in the chambers 22 and 23 of the valve 13 are balanced with biasing force of the spring 26 to control the line pressure in the first predetermined low value. Simultaneously, the spool 38 of the valve 27 is moved downward against the spring 40 to connect the circuit 7 to the drain circuit 28 and connect the circuit 16 to the circuit 29. Thus, the pressurized working oil is discharged from the servo cylinder 5 through the fluid circuits 7 and 28 to release the operation of the servo cylinder 5, to thereby engage the clutch engagement mechanism 2.

When the pressurized working oil is discharged from the servo cylinder 5 to engage the clutch engagement mechanism 2, as mentioned above, the thermostatic regulator valve 42 functions as follows. If the oil temperature in the valve 42 becomes high, the actuating arm 48a of the bimetallic element 48 flexes upwardly to cause upward movement of the spool 46 against the spring 47. This decreases the open degree of the drain circuit 28. If the oil temperature in the valve 42 becomes low, the actuating arm 48a flexes downwardly to cause downward movement of the spool 46 by the spring 47. This increases the degree of opening of the drain circuit 28. Thus, the flowing rate of working oil discharged from the drain circuit 28 to the reservoir 11 through the port 43c is substantially maintained in a predetermined value regardless of changes of the viscosity of working oil. This means that the releasing operation of the cylinder 5 may not be influenced by changes of the oil temperature in the valve 42 to ensure optimum engagement of the clutch engagement mechanism 2.

In the above embodiment, if the port 43a of the valve 42 is closed by the spool 46 moved upwardly, the working oil flowing through the drain circuit 28 is discharged from the port 43b through the orifice 44.

Figure 2:
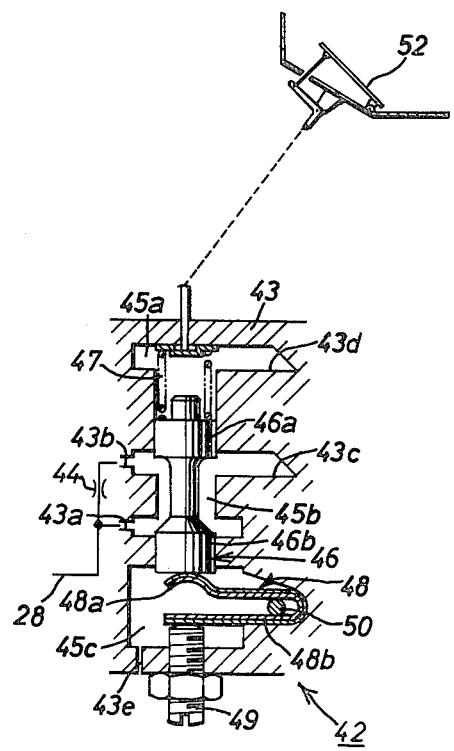
FIG. 2 illustrates a modification of the thermostatic regulator valve shown in FIG. 1.

In a modification of the present invention, as shown in FIG. 2, the spool 46 of the valve 42 may be interlocked with an accelerator pedal 52 of the prime engine in such a manner that the movement of the spool 46 is adjusted in accordance with depression stroke of the accelerator pedal 52 to control the degree of opening of the drain circuit 28. With this modification, the releasing operation of the cylinder 5 can be controlled to engage the clutch engagement mechanism 2 in accordance with depression stroke of the accelerator pedal 52.

In the embodiment of FIG. 2, a coil spring 47 is received by a retainer plate (unnumbered) at its upper end to bias the spool 46 toward the actuating arm 48a of bimetallic element 48. The retainer plate is operatively connected to the accelerator pedal 52 by means of a suitable mechanical linkage. Upon depression of the pedal 52, the retainer plate is moved downwardly to increase the biasing force of spring 47 and, in turn, the spool 46 is located in a position where the biasing force of spring 47 is balanced with the resilient force of bimetallic element 48. Thus, the degree of opening the drain circuit 28 is controlled by the downward movement of spool 46 in accordance with depression stroke of the pedal 52. This means that the flowing rate of working oil discharged from the drain circuit 28 to the reservoir through the port 43c is controlled in accordance with depression stroke of the pedal 52.

Furthermore, the thermostatic regulator valve 42 may be modified as shown in FIG. 3. In this modification, a drain passage 281 is provided to connect the port 30c of the shift valve 27 to the oil reservoir 11 through an orifice 51, and a solenoid valve 53 is provided to open and close a drain port 53a in communication with the drain passage 281. The solenoid valve 53 is connected at its one end to the plus terminal of the battery E and at its other end to the minus terminal of the battery E through a normally open thermostatic switch 54 such as a bimetallic switch. The thermostatic switch 54 is arranged to be closed when the working oil temperature becomes higher than a predetermined value. In case the solenoid valve 53 is energized by closing of the thermostatic switch 54 to close the drain port 53a, the pressurized oil discharged from the servo cylinder 5 across the shift valve 27 will flow into the oil reservoir 11 through the orifice 51. In case the solenoid valve 53 is deenergized by opening of the thermostatic switch 54 to open the drain port 53a, the pressurized oil from the servo cylinder 5 will be discharged into the oil reservoir 11 through the drain port 53a and the orifice 51. Thus, the flowing rate of working oil discharged from the servo cylinder 5 is substantially maintained in a predetermined value regardless of changes of the oil temperature, as similar as the thermostatic regulator valve 42.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:
1. A control system of a clutch engagement mechanism drivingly connected to an output shaft of an engine and an input shaft of a transmission to be shifted by a manual lever, the system comprising:
   servo means operatively connected to said clutch engagement mechanism for engaging and disengaging said clutch engagement mechanism;
   shift valve means for connecting a source of oil pressure to said servo means upon shifting of said manual lever to operate said servo means and for connecting said servo means to an oil reservoir after shifting of said manual lever to release the operation of said servo means;
   first and second drain passage means arranged in parallel and connecting said shift valve means to said oil reservoir;
   thermostatically operated valve means, disposed within said first drain passage means for controlling the flow of oil discharged from said servo means to said oil reservoir through said first drain passage means in accordance with changes of the oil temperature, said second drain passage means constantly permitting the flow of oil, which has been bypassed around said first drain passage, to said oil reservoir; and
   flow restriction means disposed within said second drain passage means for throttling the bypassed oil flow.

2. A control system as claimed in claim 1, wherein said thermostatically operated valve means comprises a housing including first and second inlet ports respectively disposed within said first and second drain passage means and a drain port disposed within said first drain passage means; a spool member movable within said housing for regulating the flow of oil discharged from said first inlet port to said drain port and constantly permitting the flow of oil from said second inlet port to said drain port; and a bimetallic element provided within said housing for controlling the movement of said spool member in accordance with changes of the oil temperature.

3. A control system as claimed in claim 2, wherein said spool member is interlocked with an accelerator pedal of said engine to control the movement of said spool member in such a manner that the flow of oil discharged from said first inlet port to said drain port is controlled in accordance with depression stroke of said accelerator pedal.

4. A control system as claimed in claim 1, wherein said thermostatically operated valve means comprises a solenoid valve disposed within said first drain passage means to open and close said first drain passage means; and a normally open thermostatic switch disposed within an electric circuit connecting said solenoid valve to a source of electric energy and arranged to be closed when the oil temperature becomes higher than a predetermined value, whereby upon closing of said thermostatic switch, said solenoid valve is energized to close said first drain passage means.

5. A control system as claimed in claim 1, wherein said thermostatically operated valve means comprises a housing connected to said first and second drain passage means and means, disposed within said housing, for regulating flow of oil discharged from said servo means to said oil reservoir.

* * * * *